(12) United States Patent
Bonanotte et al.

(10) Patent No.: US 7,988,437 B1
(45) Date of Patent: Aug. 2, 2011

(54) METHOD AND APPARATUS FOR INSTALLING FLEXIBLE LININGS IN UNDERGROUND PIPES

(75) Inventors: Ralph Bonanotte, Mokena, IL (US); Doug Beck, Paoli, IN (US)

(73) Assignee: Layne Christensen Company, Mission Woods, KS (US)

( * ) Notice: Subject to any disclaimer, the term of this patent is extended or adjusted under 35 U.S.C. 154(b) by 0 days.

(21) Appl. No.: 12/710,767

(22) Filed: Feb. 23, 2010

(51) Int. Cl.
*B29C 73/00* (2006.01)
(52) U.S. Cl. .............................. 425/11; 425/13; 156/287
(58) Field of Classification Search .................... 425/11, 425/13, 182; 156/287; 118/105, DIG. 10
See application file for complete search history.

(56) References Cited

U.S. PATENT DOCUMENTS

| | | | | |
|---|---|---|---|---|
| 3,650,644 A | * | 3/1972 | Ebert et al. ...................... 425/66 |
| 3,813,313 A | * | 5/1974 | Feucht et al. .................. 156/156 |
| 4,207,130 A | * | 6/1980 | Barber ...................... 156/244.13 |
| 4,871,413 A | * | 10/1989 | Hyodo et al. .................. 156/382 |
| 4,980,116 A | * | 12/1990 | Driver ........................... 264/516 |
| 5,154,936 A | * | 10/1992 | Driver et al. ................... 425/182 |
| 5,167,901 A | * | 12/1992 | Driver et al. ................... 264/570 |
| 5,443,377 A | * | 8/1995 | Perkins et al. ................... 425/11 |
| 5,816,293 A | * | 10/1998 | Kiest, Jr. ........................... 138/98 |
| RE35,944 E | * | 11/1998 | Driver et al. ................... 264/570 |
| 5,906,789 A | * | 5/1999 | Kamiyama et al. ........... 264/516 |
| 5,916,406 A | * | 6/1999 | Kamiyama et al. ........... 156/287 |
| 6,390,795 B1 | * | 5/2002 | Waring et al. ................... 425/11 |
| 6,960,313 B2 | * | 11/2005 | Waring et al. ............... 264/36.17 |
| 6,969,216 B2 | * | 11/2005 | Driver ........................ 405/184.2 |
| 7,476,348 B2 | * | 1/2009 | Waring ...................... 264/36.17 |
| 7,517,212 B2 | * | 4/2009 | Blackmore et al. ........... 425/460 |
| 2002/0163102 A1 | * | 11/2002 | Thompson .................... 264/285 |
| 2003/0209823 A1 | * | 11/2003 | Waring et al. .............. 264/36.17 |
| 2005/0098909 A1 | * | 5/2005 | Kiest, Jr. .................... 264/36.17 |
| 2006/0137816 A1 | | 6/2006 | Taylor et al. |
| 2006/0197262 A1 | * | 9/2006 | Waring ......................... 264/516 |
| 2007/0029688 A1 | | 2/2007 | Delaney et al. |

* cited by examiner

*Primary Examiner* — Yogendra N Gupta
*Assistant Examiner* — Emmanuel S Luk
(74) *Attorney, Agent, or Firm* — Husch Blackwell LLP

(57) ABSTRACT

A method and apparatus for installing a flexible lining tube in an underground pipe by eversion. A pressure vessel is equipped with a gasket that has an arcuate slot for receiving the lining tube in a manner that provides an effective seal without creating undue friction. A guide has a cylindrical wall curved in conformity with the slot and a conical surface leading to the cylindrical wall.

7 Claims, 4 Drawing Sheets

METHOD AND APPARATUS FOR INSTALLING FLEXIBLE LININGS IN UNDERGROUND PIPES

CROSS-REFERENCE TO RELATED APPLICATIONS

None.

FIELD OF THE INVENTION

This invention relates in general to the rehabilitation of underground pipes and deals more particularly with the installation of a flexible lining tube into an underground pipe by everting the lining tube using fluid pressure.

BACKGROUND OF THE INVENTION

Subterranean pipes and conduits such as sewers have been repaired and/or rehabilitated using a number of techniques. One approach that avoids the need for excavation is a process that involves everting a resin impregnated lining tube into the underground pipe using fluid pressure, expanding the tube with fluid pressure, and then curing the tube in place against the interior surface of the sewer pipe. Although this technique has been used for a number of years and has worked well for the most part, it has not been wholly free of problems.

For example, when everting the lining tube into the sewer pipe, significant friction forces must be overcome. As exemplified by U.S. Pat. No. 6,390,795 to Waring et al., the lining tube is typically flattened and extended through a linear slot. The slot must provide a seal that is tight enough to maintain adequate pressure for everting the tube, while the seal must not be so tight that the frictional forces are unduly high. Using a linear slot such as in the Waring patent has proven to be problematic because the seal applies so much friction that there is an excessive restraint on pulling of the liner into the sewer pipe.

SUMMARY OF THE INVENTION

In accordance with the present invention, an improved method and apparatus is provided for installing flexible lining tubes into underground pipes such as sewers. A pressure vessel is equipped with a gasket in which an arcuate slot is formed. The lining tube is collapsed with its walls overlaid in a double-ply configuration and arranged in a curve to conform with the shape of the arcuate slot. This allows the lining tube to be extended through the slot, preferably with guidance from a forming member having a wall that is curved generally in conformity with the curvature of the arcuate slot. The leading end of the lining tube is coupled with the downstream end of the pressure vessel in a substantially fluid tight manner. Fluid pressure applied to the pressure vessel propels the lining tube out of the vessel and into the pipe as the tube is everted and continuously pulled through the slot until the entirety of the tube has been installed in the underground pipe.

The curved configuration of the slot is a significant feature of the invention. The smooth curvature results in reduced friction to facilitate passage of the lining tube through the slot while reducing the power that is needed for eversion. At the same time, the slot can be custom cut to a size that effects a sufficient seal with the lining tube allowing eversion to proceed without large losses of pressure containment. The construction of the equipment preferably allows different gaskets to be interchanged so that different sizes of lining tubes can be accommodated without the need for wholly different equipment for each size.

Other and further objects of the invention, together with the features of novelty appurtenant thereto, will appear in the course of the following description.

BRIEF DESCRIPTION OF THE SEVERAL VIEWS OF THE DRAWING

In the accompanying drawings, which form a part of the specification and are to be read in conjunction therewith and in which like reference numerals are used to indicate like or similar parts in the various views.

DETAILED DESCRIPTION OF THE INVENTION

Figure 1:
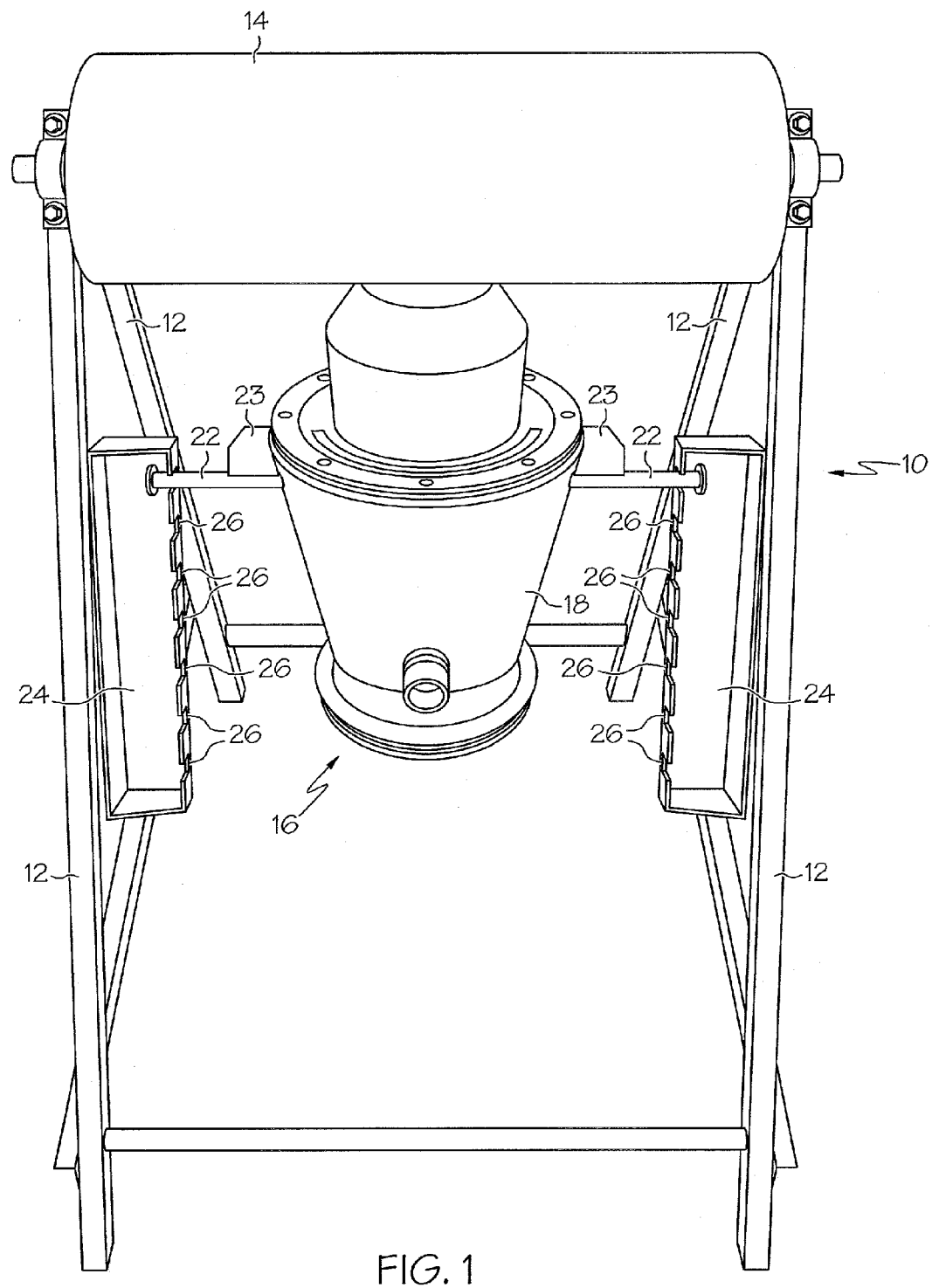
FIG. 1 is a perspective view of an apparatus for installing flexible lining tubes in underground pipe in accordance with a preferred embodiment of the present invention.

Referring now to the drawings in more detail and initially to FIG. 1, numeral 10 generally designates a stand which may be used for the mounting of a flexible lining tube installation device constructed according to the present invention. The stand 10 includes opposing pairs of legs 12. Each pair of legs is arranged generally in the configuration of the letter A to provide an A-frame structure when the stand 10 is erected. A roller 14 is supported for rotation at the top ends of the A-frames provided by legs 12. The axis about which roller 14 turns is preferably a generally horizontal axis. The stand 10 may be arranged to collapse for ease of storage and transport.

Figure 2:
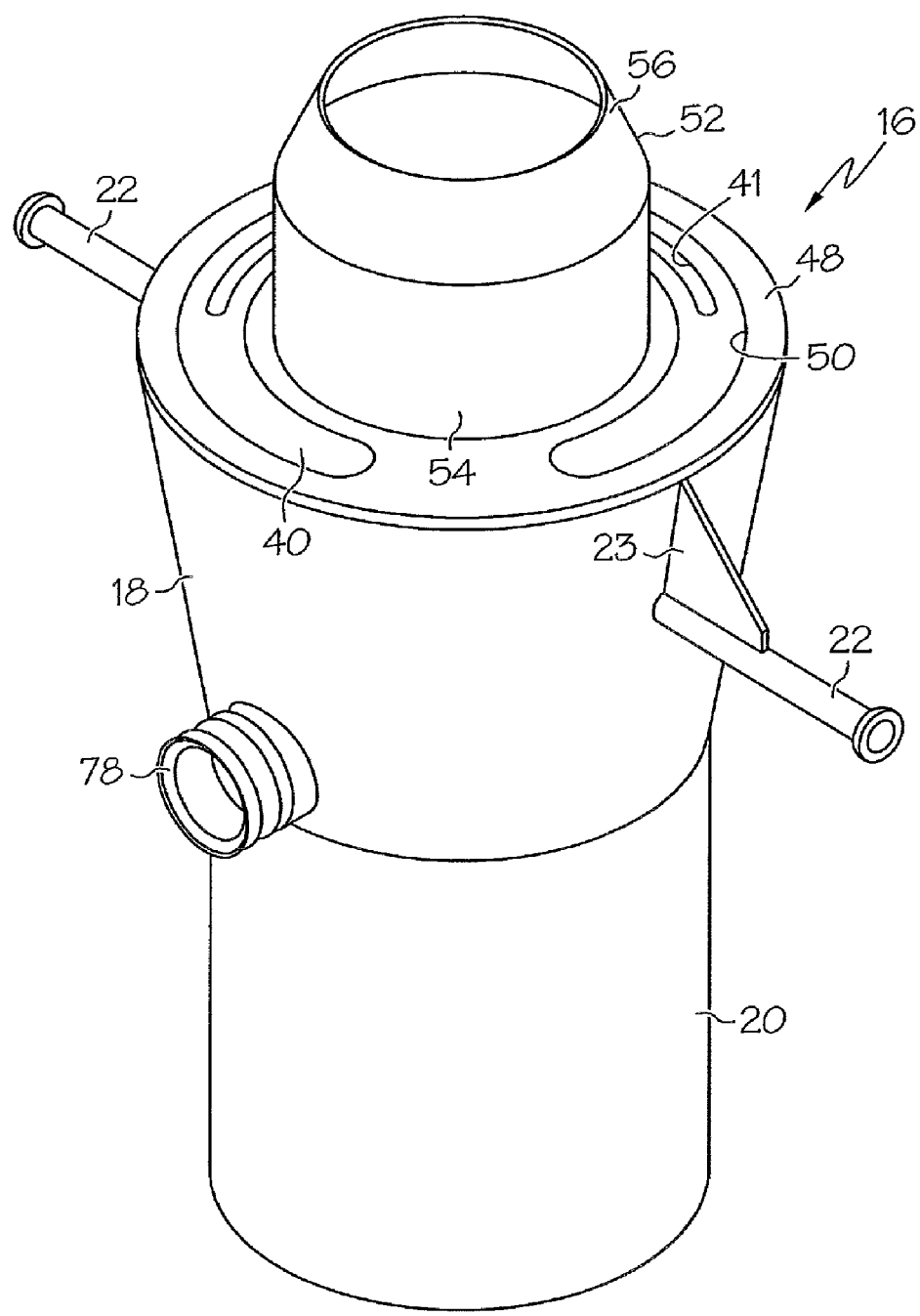
FIG. 2 is a perspective view of eversion apparatus that may be used in accordance with the invention.

In use of the equipment, the stand 10 is erected on a horizontal support surface that overlies a manhole or other access to the underground pipe which is to be rehabilitated in accordance with the invention. The stand 10 may provide support for an eversion device which is generally identified by numeral 16. As shown additionally in FIGS. 2 and 3, the eversion device 16 provides a pressure vessel which includes a funnel shape body 18 connected at its lower end with a cylindrical tube 20. Opposite sides of the body 18 are provided with co-axial shafts 22 having their connections with body 18 reinforced by gusset plates 23. The shafts 22 may be supported at their outer ends on brackets 24 (FIG. 1) which are secured to the legs 12 of stand 10. The brackets 24 provide a number of pockets 26 in which the ends of the shaft 22 are received, with the pockets 26 varying in their elevation to allow variation in the elevation of the eversion device 16. When shafts 22 are applied to the brackets 24, the shafts provide a horizontal axis about which the eversion device 16 may pivot on the stand 10.

Figure 3:
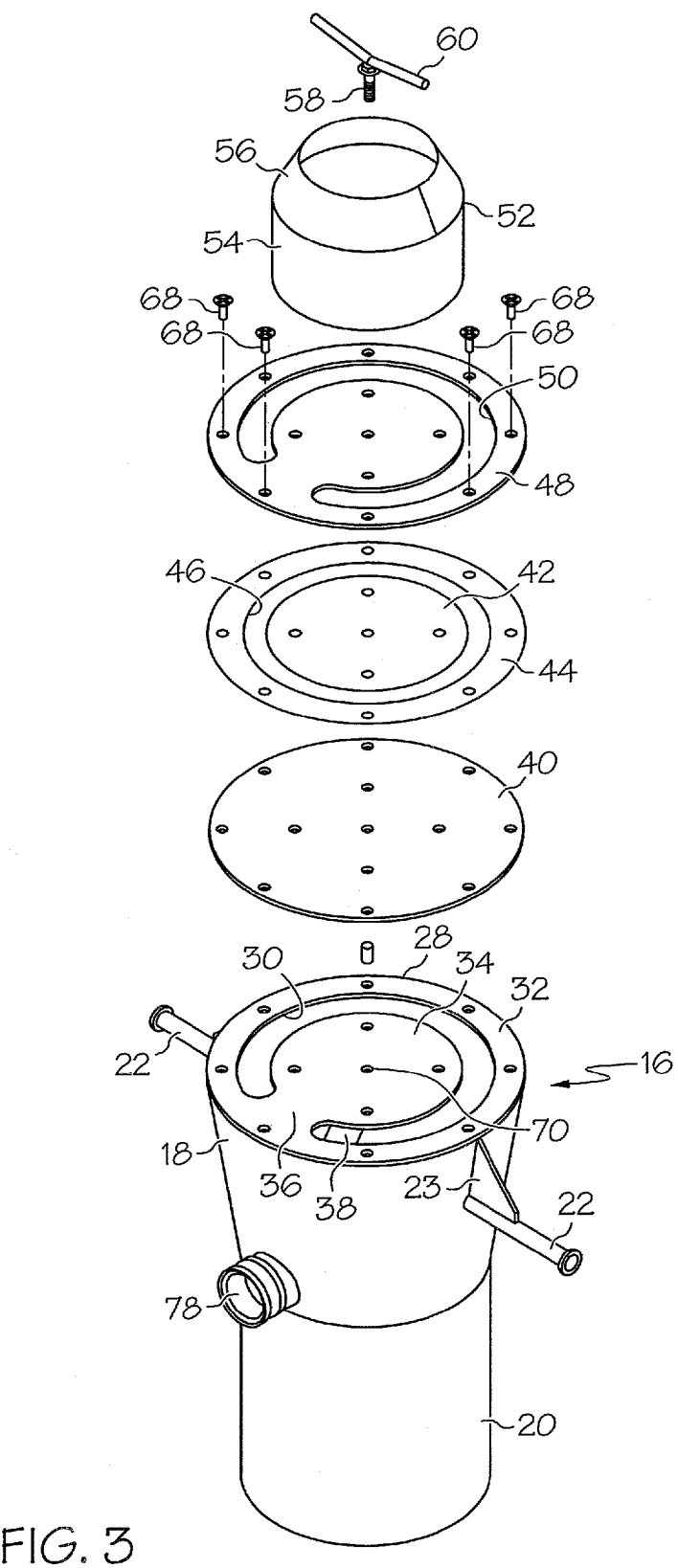
FIG. 3 is an exploded perspective view of the apparatus shown in FIG. 2.

With reference to FIG. 3 in particular, the upper end of body 18 is covered by a circular plate 28 which may be welded or otherwise suitably secured to the upper edge of body 18. An arcuate slot 30 is fanned through plate 28 with its center of curvature coincident with the center of plate 28. The slot 30 separates plate 28 into a peripheral ring 32 and a circular center 34 which are connected by a neck 36 located between the opposite ends of the arcuate slot 30. An angled brace 38 located within body 18 is connected at its upper end with the center of plate 28 and at its lower end with the interior wall of body 18 to provide support for the center portion 34 of plate 28. The brace 28 extends beneath the neck 36 to avoid obstructing the area beneath slot 30.

With continued reference to FIG. 3, a circular gasket 40 overlies plate 28. The gasket 40 may be constructed of any material suitable to provide a seal with the lining tube that is installed by the eversion device 16. For example, the gasket 40 may be constructed of a reinforced silicon material. As will be explained, prior to use, an arcuate slot 41 (see FIGS. 2 and 4) is cut through the gasket 40. While an arcuate slot is preferred, other curved slot configurations may be used as well.

Optional shims 42 and 44 (FIG. 3) may be utilized in the eversion device 16. Shim 42 may be in the form of a circular disk having a smaller diameter than the gasket 40. Shim 44 may take the faun of an annular ring having an outer diameter substantially equal to that of gasket 40. The inside diameter of shim 44 is greater than the outside diameter of shim 42 to provide a continuous annular opening 46 between the shims 42 and 44. The opening 46 is located and shaped to register with the slot 41 that is cut in gasket 40 when the shims 42 and 44 are applied on top of gasket 40.

A face plate 48 overlies gasket 40 (and shims 42 and 44 when they are used) and may have the same construction as plate 28, including an arcuate slot 50 which is identical in size and shape to slot 30. When the equipment is assembled, the gasket 40 is sandwiched between plates 28 and 48, with the shims 42 and 44 optionally being sandwiched between the gasket 40 and face plate 48.

A guide 52 is mounted on top of the face plate 48 and acts to provide assistance in guiding of the flexible lining tube in a manner to be explained in more detail. The guide 52 has on its lower portion a cylindrical wall 54 having a lesser diameter than that of the inside edge of slot 50. The top portion of guide 52 takes the form of a frusto-conical surface 56 which tapers upwardly from the upper edge of the wall 54. The guide 52 may be secured in place by a bolt 58 equipped with a tee handle 60 to facilitate tightening and loosening of the bolt 58.

Figure 4:
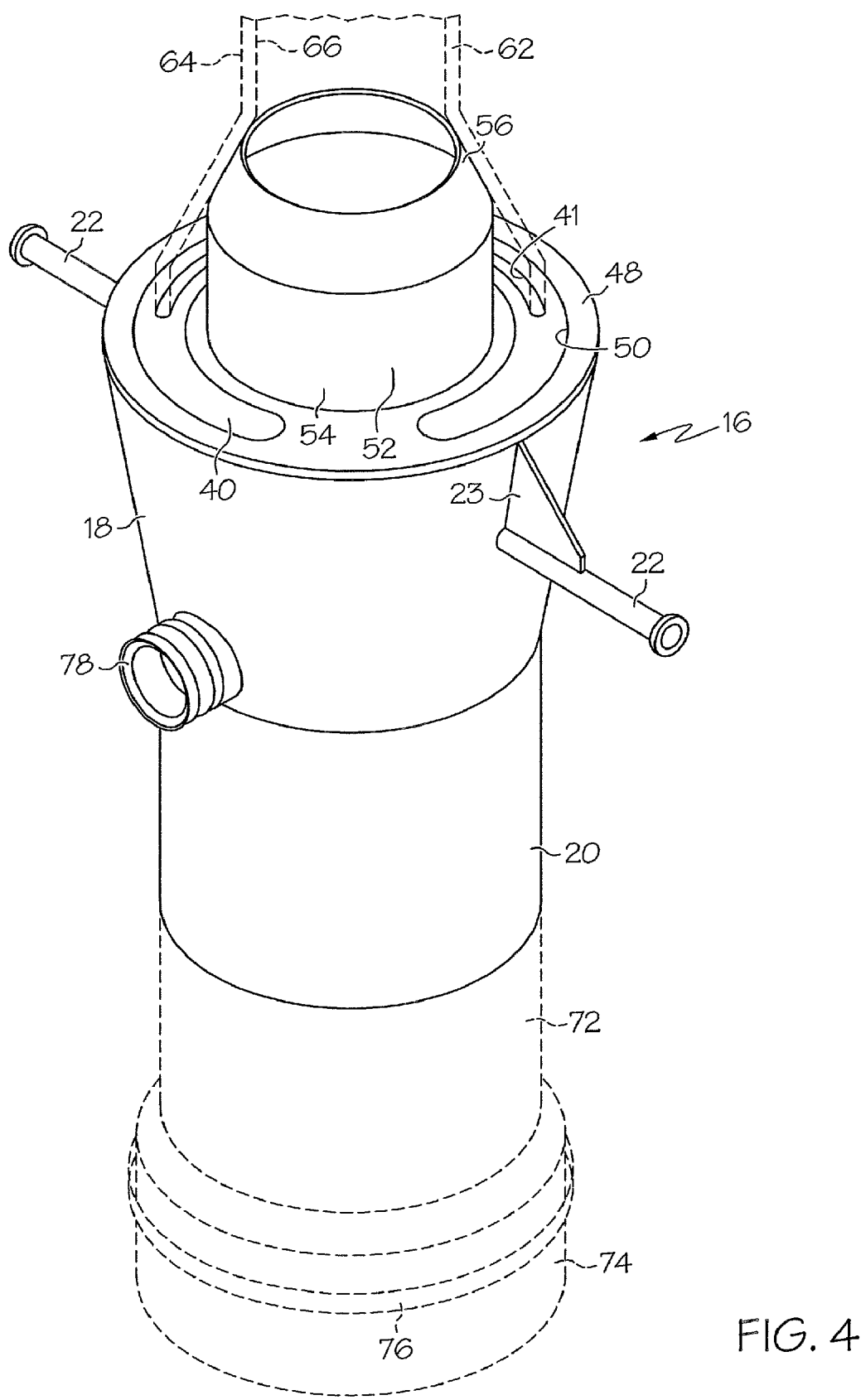
FIG. 4 is a perspective view of the eversion apparatus with a flexible lining tube that is to be installed depicted in broken lines.

In setting up device 16 for use, the gasket 40 is provided with the arcuate slot 41 that is cut with a curvature to conform with the curvature of slots 30 and 50 and a width and length to accommodate the flexible lining tube that is to be installed. As shown in FIG. 4, the lining tube 62 is initially arranged in a collapsed condition with its walls 64 and 66 overlaid on one another in a double ply configuration. The slot 41 which is formed in gasket 40 may be cut in any desirable manner. However, it is important for the width of the groove to be sufficient to allow tube 62 to be pulled through the slot 41 without excessive friction that may provide an undue restraint to the process. Conversely, the slot 41 should not be so large that it provides an ineffective seal with the tube 62 such that inadequate pressure for eversion is maintained within the eversion device 16.

After the arcuate slot 41 has been cut in gasket 40 in the appropriate size and shape for the particular lining tube that is being handled, the gasket 40 is applied to plate 28 with slot 41 aligned with slot 30. The face plate 48 is then applied on top of the gasket 40, optionally with the shims 42 and 44 interposed between the gasket 40 and the face plate 48. The face plate 48 is installed with its slot 50 in alignment with slot 41. The shims 42 and 44 are preferably installed when relatively thin tubes 62 are to be handled by the equipment. Screws 68 (see FIG. 3) or other fasteners may be applied through preformed holes in the face plate 48, shims 42 and 44 and gasket 40 and threaded into holes in the plate 28 to secure the upper assembly on top of body 18. Guide 52 is then secured on top of the face plate 48 by extending the bolt 58 through center holes in the face plate 48, shim 42 and gasket 40 and threading the bolt 58 into an opening 70 formed in the center of plate 28.

The tube 62 is arranged for installation and is impregnated with resin in a manner well known in the industry. Tube 62 is initially arranged in its collapsed condition with its walls 64 and 66 overlaid on one another and the leading end of the tube 62 arranged in a curve conforming with the curvature of slot 41. The leading end of tube 62 is extended through slot 41 and through the eversion device 16. As shown in FIG. 4, an end can 72 may be releasably secured to the bottom of tube 20 so that the end of tube 62 can be extended through the end can 72 and arranged in a cuff 74 (FIG. 4). The cuff 74 may be turned upwardly on the lower end portion of the end can 72 and secured by a band 76 or other securing means.

Fluid pressure may then be applied to the interior of the eversion device 16 through a hose coupling 78 in order to pressurize the inside of the pressure vessel. The fluid is typically air but may be any suitable fluid. The fluid pressure pushes the tube 62 out through the bottom of the end can 72 while everting the tube 62 and pulling it continually through the slot 41. As the tube 62 is everted and extended out through the bottom of the end can 72, it is extended through a manhole (not shown) into an underground sewer pipe. Once the bottom of the manhole has been reached, the eversion device 16 may be moved downwardly on stand 10 into one of the lower pockets 26 in order to provide slack in tube 62 so that the tube can be turned generally horizontally into the sewer pipe.

The fluid pressure is then applied again to the pressure vessel to complete installation of the tube 62 through the desired length of the sewer pipe. The pressure may then be relieved, and the eversion device 16 may be detached from the end can 72 prior to subsequent addition of heat and pressure to the tube 62 in accordance with conventional practice to expand tube 62 against the interior wall of the sewer pipe and cure it in place.

Due to the curved shape of slot 41, the friction encountered when pulling tube 62 through slot 41 is reduced without significant pressure loss within the pressure vessel. The tube 62 is guided into the slot due to the cylindrical shape of wall 54 and the conical shape of surface 56 as the tube 62 feeds into slot 41.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. Apparatus for installing a flexible lining tube in an underground pipe wherein the lining tube has an initially collapsed condition in which walls of the tube are overlaid in a double ply configuration, said apparatus comprising:
    a pressure vessel having a top portion and a bottom portion arranged to be coupled with the lining tube in a substantially fluid tight manner;
    a gasket on said top portion of the pressure vessel having a curved slot through which the lining tube may extend in a substantially fluid tight fit with the lining tube in said collapsed condition thereof; and means for applying fluid pressure to said pressure vessel in a manner to pull the lining tube through said curved slot and move the lining tube out of said pressure vessel into said underground pipe while everting the lining tube.

2. Apparatus as set forth in claim 1, including a guide on said top portion of said pressure vessel above said gasket, said guide having a curved wall to assist passage of the lining tube into and through said curved slot.

3. Apparatus as set forth in claim 2, including a generally conical surface on said guide above said curved wall.

4. Apparatus as set forth in claim 1, including:
a stand adapted to rest on a support surface above the underground pipe, said stand providing a mount for supporting said pressure vessel for pivotal movement about a substantially horizontal axis; and
a roller on said stand over which the lining tube may pass as the lining tube is pulled through said curved slot.

5. Apparatus as set forth in claim 1, including a plate on said top portion of said pressure vessel underlying said gasket, said plate having an opening in registration with said curved slot.

6. Apparatus as set forth in claim 1, including a pair of plates on said top portion of said pressure vessel between which said gasket is sandwiched, said plates having openings in registration with said curved slot.

7. Apparatus as set forth in claim 6, including a first shim between said plates on the inside of said curved slot and a second shim between said plates on the outside of said curved slot.

* * * * *